United States Patent [19]

Tanaka

[11] 4,380,087
[45] Apr. 12, 1983

[54] X-RAY FILM CASSETTE

[75] Inventor: Tsuneo Tanaka, Tokyo, Japan

[73] Assignee: Tokyo Shibaura Denki Kabushiki Kaisha, Kawasaki, Japan

[21] Appl. No.: 183,816

[22] Filed: Sep. 3, 1980

[30] Foreign Application Priority Data

Sep. 6, 1979 [JP] Japan .................................. 54-114524

[51] Int. Cl.³ ............................................ G03B 41/16
[52] U.S. Cl. .................................... 378/186; 378/187; 378/188
[58] Field of Search ....................... 250/482, 481, 508; 378/186, 187, 188

[56] References Cited

U.S. PATENT DOCUMENTS

| | | |
|---|---|---|
| 3,001,071 | 9/1961 | Reiss ........................................ 250/68 |
| 3,157,787 | 11/1964 | Kendziorski, Jr. et al. ............ 250/68 |
| 3,683,182 | 8/1972 | Farmer . |
| 4,110,624 | 8/1978 | Conteas ................................. 250/481 |
| 4,126,788 | 11/1978 | Koontz et al. ......................... 250/481 |
| 4,146,793 | 3/1979 | Bergstrom et al. ...................... 41/16 |
| 4,205,116 | 5/1980 | Landeghem et al. ................. 250/482 |

FOREIGN PATENT DOCUMENTS

| | | |
|---|---|---|
| 849114 | 8/1979 | Canada . |
| 8006306 | 7/1980 | Fed. Rep. of Germany . |
| 1385351 | 2/1975 | United Kingdom ................ 250/482 |

OTHER PUBLICATIONS

Japanese Utility Model Publication No. 55-18820, Translation.

Primary Examiner—Alfred E. Smith
Assistant Examiner—T. N. Grigsby
Attorney, Agent, or Firm—Finnegan, Henderson, Farabow, Garrett & Dunner

[57] ABSTRACT

In an X-ray film cassette, a front cover and a bottom cover are severally formed of carbon fiber reinforced plastics. A grid member for the removal of scattered X-rays is bonded to the inside of a panel of the front cover, and a coating layer for protection is provided to cover the whole surface of the grid member on the exposed side thereof. The coating layer is also formed of carbon fiber reinforced plastics.

6 Claims, 6 Drawing Figures

X-RAY FILM CASSETTE

This invention relates to an X-ray film cassette removably set in an X-ray apparatus and holding a sheet-like film while an X-ray photograph is being taken.

In taking an X-ray photograph, a sheetlike film is interposed between two intensifying screens and put in a flat, boxlike X-ray film cassette, and the cassette is set in a given position in an X-ray apparatus. Then, the apparatus is actuated by an operator, and an X-ray image of a subject, such as a patient, is exposed on the film inside the cassette.

Such cassettes are removed from the apparatus after every shot and be replaced with a new one for the next shot. These cassettes are handled rather frequently, since they are also stacked and carried here and there. Accordingly, it is essential for these cassettes to be highly durable and light. As another important requirement, these cassettes should be highly permeable to X-ray so that an image may be recorded on the film without having to expose the patient to an unnecessary high dose of radiation. In a prior art cassette, a front cover on the incident side may be composed of a solid outside frame of aluminium or cast steel and a thin panel of bakelite or steel stuck on the frame. Further, a bottom cover swingably hinge-coupled to the front cover may be formed of aluminium or steel.

In the cassette of such construction, an aluminium front panel is poor in X-ray permeability and heavy although it involves no problems as regards the mechanical strength. Although a bakelite panel, on the other hand, surpasses the aluminium panel in X-ray permeability and lightness, it is poorer in strength.

In the aforementioned construction, moreover, the outside frame is formed considerably thick in order to maintain due strength, and is made of aluminium or steel. Accordingly, X-rays are scattered at the frame section to cause deterioration of the picture-quality of X-ray photographs obtained. Since the front panel of bakelite or aluminium is screwed or bonded to the frame, undesirable stress may remain within the panel to cause a warp in the panel with the lapse of time. As for bakelite, it flaws easily.

If the cassette is dropped by mistake or subjected to any external impulsive force, the frame will probably be flawed and distorted. The distortion of the frame will cause the front panel to warp. The warp in the panel will break the contact between the film and intensifying screens inside the cassette, thereby deteriorating the picture-quality. Flaws in the frame or panel will appear directly in X-ray photograph images reducing the accuracy thereof and increasing the undesired effect of scattered X-rays.

As materials to fulfill the aforementioned requirements including the X-ray permeability, lightness and mechanical strength, carbon fiber reinforced plastics (abbreviated CFRP) have recently been found and used for medical equipment. In U.S. Pat. No. 4,146,793, for example, it is disclosed to make use of such carbon fiber reinforced plastics for part of a patient's table top and components of an X-ray device.

In the aforesaid use, however, the resins are formed into a substantially platelike, relatively large and simple structure; a small-sized, sophisticated structure formed with a complicated process has not yet been used. Practically, these materials have so far been limited to applications in special fields because it is costly and hard for them to be formed into a suitable configuration.

Conventionally, an X-ray grid member called Lysholm Blende is used to prevent secondary scattered radiation of X-rays. In general, this grid member is formed by alternately arranging, in the shape of a grid, lead leaves to absorb secondary scattered X-rays and a number of spacers made of aluminium, plastic, bakelite, or fibrous material, such as wood, cardboard or the like, which absorb few X-rays. For the protection of its surfaces, this structure is covered with at least one sheath or sheet of aluminium, plastic or bakelite coating.

Usually, such a grid member of a size the same as that of the cassette is laid on the cassette at the incident or front side thereof when the cassette is set in an X-ray apparatus. In this case, therefore, the grid member must be selected to conform to the cassette in size, and both must be installed in the apparatus for each exposure. Further, the X-ray apparatus need be provided with a space and support means for the setting of the grid member. Furthermore, the use of the grid member causes considerable attenuation of X-rays when they are transmitted through front and back metal sheaths or sheets attached to the grid member. Thus, with use of such a grid member, there are required higher voltage and a greater dose of X-rays to be applied.

The object of this invention is to provide an X-ray film cassette improved in mechanical strength as compared with the conventional metal cassettes, hard to flaw, light and portable, permeable to X-rays, and capable of minimizing scattered X-rays and having an intensifying screen and X-ray film uniformly pressed together.

In order to attain the above object of the invention, at least a front cover of the cassette on the incident side thereof is integrally formed of carbon fiber reinforced plastics.

Preferably, a bottom cover hinge-coupled to the front cover, is also integrally formed of carbon fiber reinforced plastics.

The front and bottom covers include not only a plate-like panel section but also a side wall bent to surround the panel section. Structures of such configuration can be formed integrally by using an up-to-date forming technique. Practically, the use of such cassette integrally formed of carbon fiber reinforced plastics can provide unexpectedly high mechanical stability, as well as convenience of easy handling and improvement of picture-quality.

In a specific arrangement of the invention, moreover, one side of a grid member free of any coating layer, as a sheath is bonded to the inside of the front cover, i.e. the inner face of the front panel, and the grid member covers substantially the whole area of the inner face of the front panel. On the other side of the grid member, there is provided a coating layer formed, for example of carbon fiber reinforced plastics to serve as a protective sheath. Thus, the use of the grid member for each individual cassette obviates the aforementioned trouble of grid member setting that has conventionally been an important problem. In the aforesaid construction of the invention, moreover, the coating layer covers only one side of the grid member and is made of carbon fiber reinforced plastics, so that the problem of X-ray attenuation due to such sheathing of the grid member is eased to a great degree.

This invention can be more fully understood from the following detailed description when taken in conjunction with the accompanying drawings, in which:

FIG. 3 is a sectional view of a second embodiment of the X-ray film cassette of the invention, corresponding to the drawing of FIG. 2;

Figure 1:
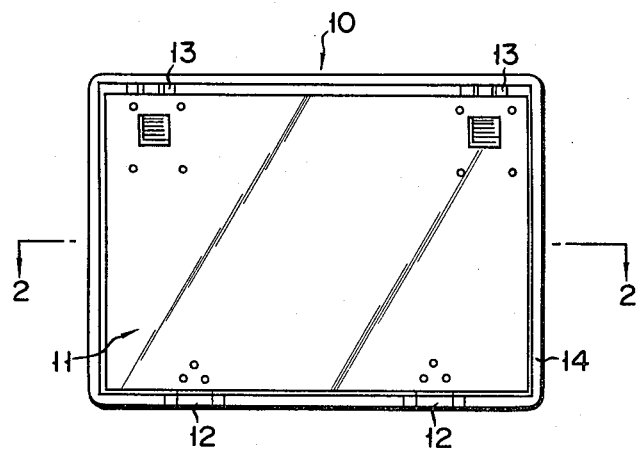
FIG. 1 is a rear view of a first embodiment of the X-ray film cassette of this invention.
Figure 2:
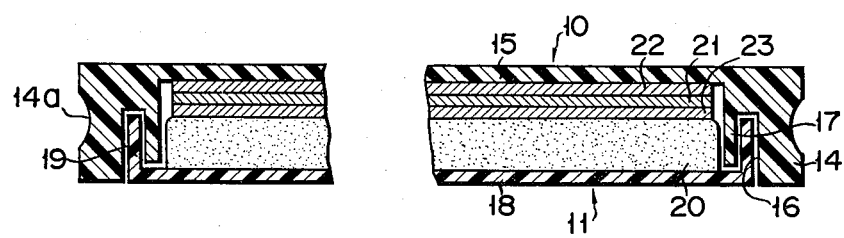

A flat, boxlike X-ray film cassette according to a first embodiment of the invention shown in FIGS. 1 and 2 includes a rectangular front cover 10 on the incident side and a rectangular bottom cover 11 swingably coupled to the front cover 10 by means of hinges 12. In the rear view of FIG. 1, the cassette is closed. The hinges 12 are attached to edges of the front and bottom covers 10 and 11, and manual-release latches 13 to lock both these covers in a closed position are attached to the other edges. These hinges 12 and latches 13 are of conventional types.

As may be seen from FIG. 1, a side wall 14 surrounds the whole circumference of the front cover 10. The wall 14 is bent at right angles to a platelike front panel 15.

As may be seen from FIG. 2, a rib 17 is formed on the back or inside of the front panel 15 to cover the whole circumference thereof, extending in parallel with the side wall 14 to define a channel 16 therebetween. The front panel 15, side wall 14 and rib 17 of the front cover 10 are integrally formed of carbon fiber reinforced plastics. The front panel 15 can enjoy desired mechanical strength in spite of its relatively thin thickness of, for example, 1.1 mm.

The bottom cover 11 is composed of a platelike bottom panel 18 and a side wall 19 bent at right angles to the bottom panel 18 and extending along the whole circumference thereof. Like the front cover 10, the bottom panel 18 and side wall 19 are integrally formed of carbon fiber reinforced plastics. As shown in FIG. 2, the side wall 19 of the bottom cover 11 is fitted in the channel 16 of the front cover 10 when the cassette is closed. A platelike cushion member 20 of sponge rubber or felt is bonded on one side thereof to the back or inside of the bottom panel 18. The cushion member 20 has such width that it precisely fills the region surrounded by the rib 17 of the front cover 10 when the cassette is closed.

An arcuate recess 14a is formed in the outer peripheral surface of the side wall 14 of the front cover 10 to cover the whole circumference thereof. This recess 14a serves as a guide groove for the setting of the cassette in an X-ray photographing apparatus (not shown).

Resins used for the aforesaid material, i.e. the carbon fiber reinforced plastics, may include epoxy resins, polyester resins, etc. Such carbon fiber reinforced plastics are too hard to flaw easily, light, hardly deformable, resistant to shock and chemicals, and high in X-ray premeability.

Table 1 shows the weight of the cassette of this invention compared with that of a prior art cassette of the same type made of metal.

TABLE 1

| Size (inch)* | Invention (g) | Prior Art (g) |
|---|---|---|
| 10 × 12 | 600 | 1,250 |
| 8 × 10 | 400 | 850 |
| 9.5 × 9.5 | 450 | 950 |

*The thickness of all these cassettes is standardized at 14 mm.

Thus, according to this invention, the weight of the cassette can substantially be reduced, so that the heaviness of handling work, such as setting, removal and conveyance of the cassette, can be lightened to provide a boon for women operators, in particular.

An X-ray film 21 is set in the X-ray film cassette of the invention, as shown in FIG. 2. Intensifying screens 22 and 23 are disposed on both sides of the film 21, severally. The intensifying screen 22 is stuck on the inside of the panel 15 of the front cover 10, while the other intensifying screen 23 is stuck on the cushion member 20. When the film cassette is closed, the film 21 is brought closely in contact with the upper and lower intensifying screens 22 and 23 by the elasticity of the cushion member 20 and kept in a plane parallel to the panel 15 within the cassette.

X-ray photographing with use of the X-ray film cassette loaded with the film, which exhibits high X-ray permeability and less scattering of X-rays, can provide high-quality X-ray photographs. Especially in this invention, the side wall 14 of the front cover 10 is also formed of carbon fiber reinforced plastics, as a unit with the front panel 15, so that there is no fear of such scattering of X-rays as is caused at the metal frame section of the prior art cassette.

Since the front cover 10 is an extremely rigid integral product, most of the problems of the prior art structure, such as warping and distortion of panels, deformation of frame section, flawed surfaces, etc., are eliminated. Where the panels are made of metal as in the conventional case, the panel surface which directly touches the patient should be covered with leather or the like to improve the feel. According to this invention, however, the panels need not be covered with leather or any other material, since they can be agreeable to the touch and the patient does not feel cold. Integrally formed of the same material, the panels require no screwing or bonding processes in manufacture that are essential to the formation of the conventional structure. Moreover, the disuse of the leather covering leads to simplification of manufacturing processes.

Figure 3:
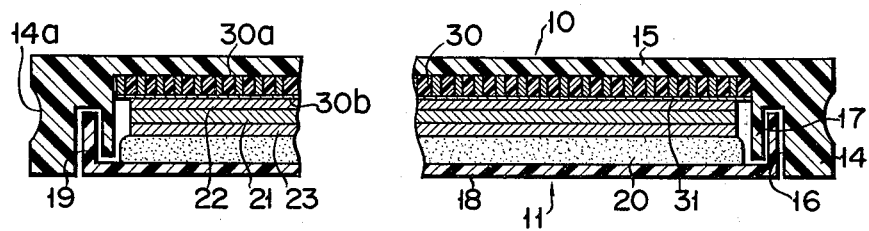
FIG. 3 is a partially broken, enlarged sectional view of the X-ray film cassette as taken along line 2—2 of FIG. 1.
Figure 4:
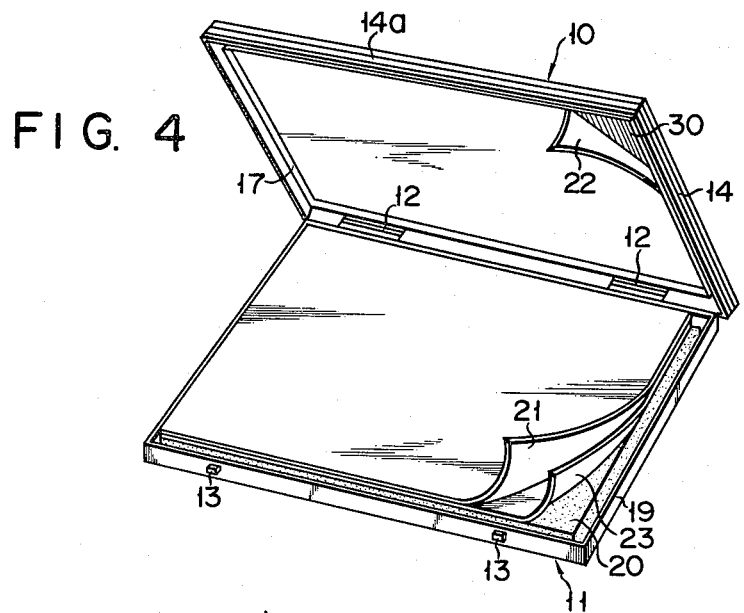
FIG. 4 is a perspective view of the embodiment of FIG. 3 in an open state, with intensifying screens and an X-ray film partially turned back.

FIGS. 3 and 4 show a second embodiment of this invention in which a grid member 30 is set in the cassette based on the structure of the first embodiment shown in FIGS. 1 and 2. In this second embodiment, members corresponding to their respective counterparts in the first embodiment are designated by like reference numerals.

Also in this embodiment, a front cover 10 is composed of a front panel 15, a side wall 14 surrounding the front panel 15, and a rib 17 extending in parallel and in close vicinity to the side wall 14 to define a channel 16 therebetween, and is integrally formed of carbon fiber reinforced plastics. A bottom cover 11 includes a bottom panel 18 and side wall 19 surrounding the bottom panel 18, and is integrally formed of carbon fiber reinforced plastics. The two covers 10 and 11 are connected by means of hinges 12, and are kept in a closed state (FIG. 3) by latches 13. A platelike cushion member 20 is bonded to the inside of the bottom panel 18.

The characteristic of this second embodiment lies in that one side 30a of the grid member 30 of a uniform thickness for reducing of scattered X-rays is bonded to the inside of the front panel 15, i.e. on the inside region of the front panel 15 surrounded by the rib 17, to cover substantially the whole area of such region. The grid member 30 may be formed of any conventional material, such as, for example, a combination of lead leaf and wood laid on each other. In the cassette of this invention, however, the bonding surface 30a of the grid member 30 is not provided with a protective sheath, as the front panel 15 serves also as such protective sheath.

A coating layer 31 as a protective sheath is formed all over the other side 30b of the grid member 30, that is, the side exposed to the interior. Preferably, the layer 31 is also formed of carbon fiber reinforced plastics.

Thus protected by the solid front cover 10 of carbon fiber reinforced plastics, the grid member 30 will hardly be distorted. Furthr, the grid member 30 extends closely along the inside of the front panel 15, so that it can be kept in parallel with a film 21 inside the cassette with improved accuracy. Since the grid member 30 is provided for each cassette, it is unnecessary to attach a separate grid member to an X-ray apparatus or to select the size of the grid member.

Like the case of the first embodiment, the film 21 set in the cassette is sandwiched between intensifying screens 22 and 23, as shown in FIG. 3. The intensifying screen 22 is stuck on the coating layer 31 of the grid member 30, while the other intensifying screen 23 is stuck on the cushion member 20.

Thus, in X-ray photographing with use of the cassette loaded with the film 21, scattered X-rays are reduced effectively by the grid member 30, and X-ray photographs of higher picture-quality can be obtained. In the case of this embodiment, moreover, one sheath of the grid member 30 can be eliminated, so that attenuation of X-rays due to the sheath is reduced by a large margin. Since the remaining sheath is not metallic, but is a thin film of carbon fiber reinforced plastics, such problem attributable to the existence of the sheath is further eased.

Also in this embodiment, like the first embodiment, the front and bottom covers are severally integrally formed of carbon fiber reinforced plastics, so that they are solid, hard to flaw, light, and produced by a simplified manufacturing processes.

In either case of the above-mentioned embodiments, the cassette of this invention absorbs much less X-rays than the prior art metallic cassette does, so that the dose of X-rays applied can substantially be decreased, and hence the X-rays exposure can be expected to be reduced. Since the irradiation time is shortened, photographs with higher resolution can be obtained without substantially causing any blurs. According to this invention, moreover, X-ray absorption is reduced, so that a wide range of X-rays from soft X-rays to hard can be transmitted. Accordingly, there may be obtained information with high gradient and contrast properties due to a wide range of distributed energy of X-rays, and the value of diagnostic information by X-ray photographs is increased in the medical field, especially.

Figure 5A:
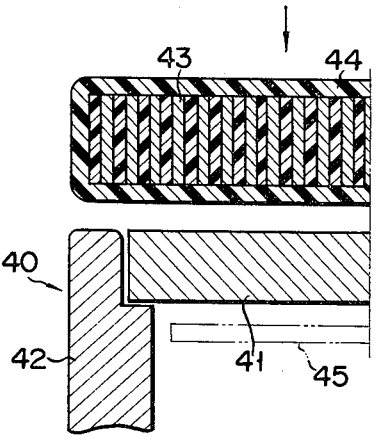
FIG. 5A is a partially broken, sectional view of a cassette of a conventional construction illustrated for comparison with the construction of the cassette of the invention.
Figure 5B:
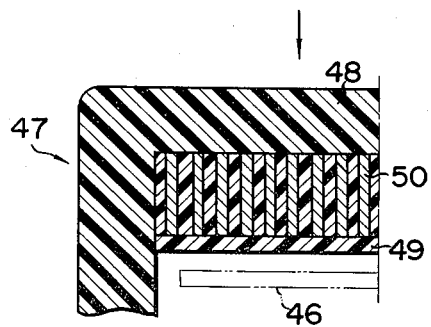
FIG. 5B is a partially broken, sectional view of the cassette according to the invention schematically showing the construction thereof for comparison with the conventional construction of FIG. 5A.

FIG. 5A shows a prior art cassette of a conventional construction, while FIG. 5B fundamentally shows the cassette according to the second embodiment of the invention. In the prior art cassette shown in FIG. 5A, a panel 41 of a front cover 40 and a side wall 42 are both made of aluminium, for example. A grid member 43 at the upper portion of the cassette is formed of layers of aluminium and lead leaf which are covered with an aluminium sheath 44.

Normally, the thickness a of the panel 41 of the cassette is $a = 1.2$ mm, the thickness b of the grid member 43 is $b = 1.5$ mm, and the thickness c of the sheath 44 is $c = 0.3$ mm.

With the prior art cassette, therefore, X-rays applied in the direction of the arrow are transmitted through aluminium portions corresponding to a thickness, $a + b + 2c = 3.3$ mm, before they reach a film 45 inside the cassette represented by the phantom line.

In the cassette of the invention of FIG. 5B, on the other hand, X-rays applied in the direction of the arrow are transmitted through material portions corresponding to a total thickness of 2.85 mm including the thickness a of a front panel 48 of a front cover 47, formed of carbon fiber reinforced plastics, of 1.1 mm, the thickness c of a sheath 49 of the same material of 0.25 mm, and the thickness b of a grid member 50, formed of e.g. wood and lead leaf, of 1.5 mm. The total thickness of 2.85 mm has the X-ray equivalent attenuation of only 0.3 mm of aluminium. In the cassette of the invention, the thickness of the front panel 48 and sheath 49 can be made smaller than those of the counterparts in the prior art cassette because the mechanical strength of carbon fiber reinforced plastics is higher than that of aluminium.

It will be understood from the above-mentioned facts how the cassette of this invention is improved in its X-ray permeability, as compared with the prior art cassette.

Thus, according to the cassette of this invention, the X-ray exposure requirements can be reduced by 30% on the average, and by 55% in many cases, as compared with the prior art cassette.

It is to be understood that the cassette of this invention is not limited to the X-ray irradiation, and may be also used as a cassette to store films for any other radiation than X-ray radiation.

What is claimed is:

1. An X-ray film cassette comprising:
   a. a front cover including a front panel and a side wall integral with and surrounding said front panel, each of said front panel and said side wall being formed of carbon fiber reinforced plastics;
   b. a bottom cover including a bottom panel and a side wall surrounding said bottom panel;
   c. hinge means swingably connecting said front cover and said bottom cover; and
   d. a platelike cushion member bonded to the inside of the bottom panel of said bottom cover.

2. An X-ray film cassette comprising:
   a. a front cover including a front panel, a side wall integral with and surrounding said front panel, and a rib integral with and protruding from the inside of said front panel in parallel with said side wall to define an engaging channel between said rib and said side wall, each of said front panel, said wall, and said rib being formed of carbon fiber reinforced plastics;

b. a bottom cover including a bottom panel and a side wall integral with and surrounding said bottom panel, each of said bottom panel and side wall being formed of carbon fiber reinforced plastics;
c. hinge means swingably connecting said front cover and said bottom cover, the side wall of said bottom cover being fitted in the engaging channel of said front cover when said cassette is closed; and
d. a platelike cushion member bonded to the inside of the bottom panel of said bottom cover.

3. An X-ray film cassette comprising:
a. a front cover including a front panel and a side wall integral with and surrounding said front panel, each of said front panel and side wall being formed of carbon fiber reinforced plastics;
b. a bottom cover including a bottom panel and a side wall integral with and surrounding said bottom panel, each of said bottom panel and side wall being formed of carbon fiber reinforced plastics;
c. hinge means swingably connecting said front cover and said bottom cover;
d. a platelike cushion member bonded to the inside of said bottom panel of said bottom cover;
e. a platelike grid member of a uniform thickness bonded on one side thereof to the inside of the front panel of said front cover to cover substantially the whole inside area thereof, whereby scattered X-rays will be prevented; and
f. a coating layer for the protection of said grid member bonded to the other side of said grid member to cover substantially the whole area thereof.

4. An X-ray film cassette comprising:
a. a front cover including a front panel, a side wall integral with and surrounding said front panel, and a rib integral with and protruding from the inside of said front panel in parallel with said side wall to define an engaging channel between said rib and said side wall, each of said front panel, side wall, and rib being formed of carbon fiber reinforced plastics;
b. a bottom cover including a bottom panel and a side wall integral with and surrounding said bottom panel, each of said bottom panel and side wall being formed of carbon fiber reinforced plastics, the side wall of said bottom cover being fitted in the channel of said front cover when said cassette is closed;
c. hinges swingably connecting said front and bottom covers;
d. a platelike cushion member bonded to the inside of said bottom panel;
e. a platelike grid member of a uniform thickness bonded on one side thereof to the inside of said front panel to cover the whole inside area thereof surrounded by said rib, whereby scattered X-rays will be removed; and
f. a coating layer for the protection of said grid member bonded to the other side of said grid member to cover substantially the whole area thereof.

5. An X-ray film cassette comprising:
a. front cover means including a front panel and side wall surrounding said front panel, and integrally formed of carbon fiber reinforced plastics;
b. bottom cover means including a bottom panel and a side wall surrounding said bottom panel, and integrally formed of carbon fiber reinforced plastics;
c. hinge means swingably connecting said front and bottom cover means;
d. a platelike cushion member bonded to the inside of the bottom panel of said bottom cover means;
e. a platelike grid member of a uniform thickness bonded on one side thereof to the front panel of said front cover means to cover the substantially whole inside area thereof, whereby scattered X-rays will be prevented; and
f. a coating layer formed of carbon fiber reinforced plastics for the protection of said grid member bonded to the other side of said grid member to cover substantially the whole area thereof.

6. An X-ray film cassette according to claim 5, wherein the thickness of the front panel of said front cover means is approximately 1.1 mm, the thickness of said grid member is approximately 1.5 mm, and the thickness of said coating layer is approximately 0.25 mm.

* * * * *